United States Patent [19]
Tomita

[11] 3,841,299
[45] Oct. 15, 1974

[54] PORTABLE OUTDOOR GRILL AND FIRE STARTER UNIT

[76] Inventor: Rioe Tomita, 47-126 Kaimalolo Pl., Kaneohe, Hawaii 96744

[22] Filed: May 30, 1972

[21] Appl. No.: 257,718

[52] U.S. Cl. ............................. 126/25 B, 126/25 A
[51] Int. Cl. ............................ A47j 37/07, F24b 3/00
[58] Field of Search .............. 126/25 B, 25 R, 25 A; 110/1 F

[56] References Cited
UNITED STATES PATENTS

| 92,779 | 7/1869 | Benns | 126/25 B |
| 2,920,614 | 1/1960 | Phelps | 126/25 B |
| 3,209,743 | 10/1965 | Stewart et al. | 126/25 B |
| 3,368,544 | 2/1968 | Duncan | 126/25 B |
| 3,667,446 | 6/1972 | Morton | 126/9 R |

FOREIGN PATENTS OR APPLICATIONS

| 394,433 | 1/1909 | France | 126/25 R |
| 119,128 | 3/1901 | Germany | 126/25 R |

Primary Examiner—William E. Wayner
Assistant Examiner—Harold Joyce
Attorney, Agent, or Firm—James C. Wray

[57] ABSTRACT

A portable unit has a vertically orientated hollow lower body defining a fire box provided with adjustable draft control means and within which folded, crumbled or twisted paper is ignited and the fire box has an open upper end portion that is closed off by a grate means on which charcoal briquets are supported to be ignited by the burning paper. The upper end portion supports the lower end portion of an upper hollow body that defines a drill body which is in substantial vertical alignment with the fire box and which has an open upper end portion provided with angularly related rests that support a foodstuff grid which closes off the upper end portion of the grill body. The grid can be moved laterally of the grill body from a supported cooking position thereon to a detached serving position remote therefrom and can be positioned on the rests at selected heights relative to the underlying burning charcoal briquets.

8 Claims, 9 Drawing Figures

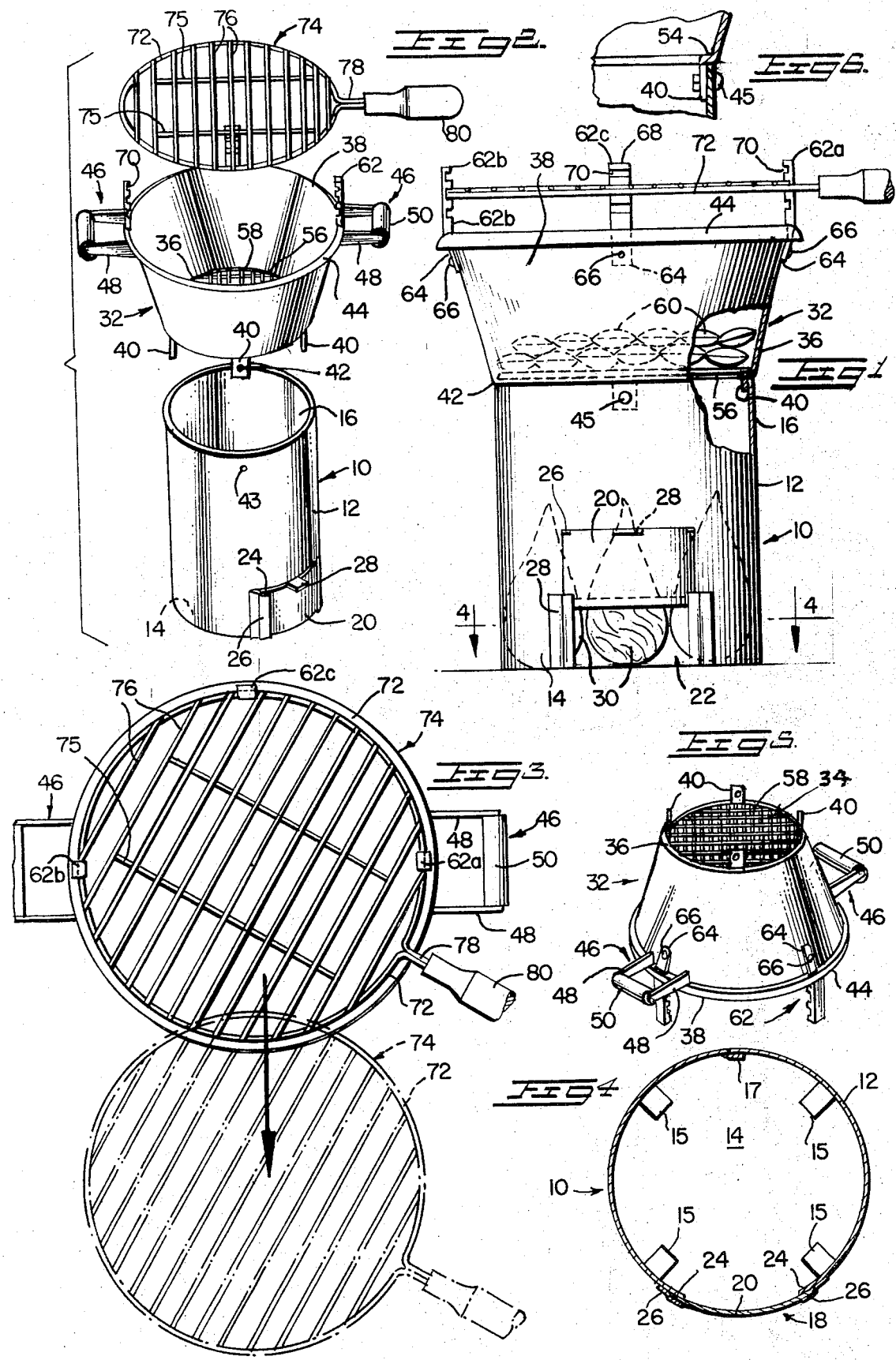

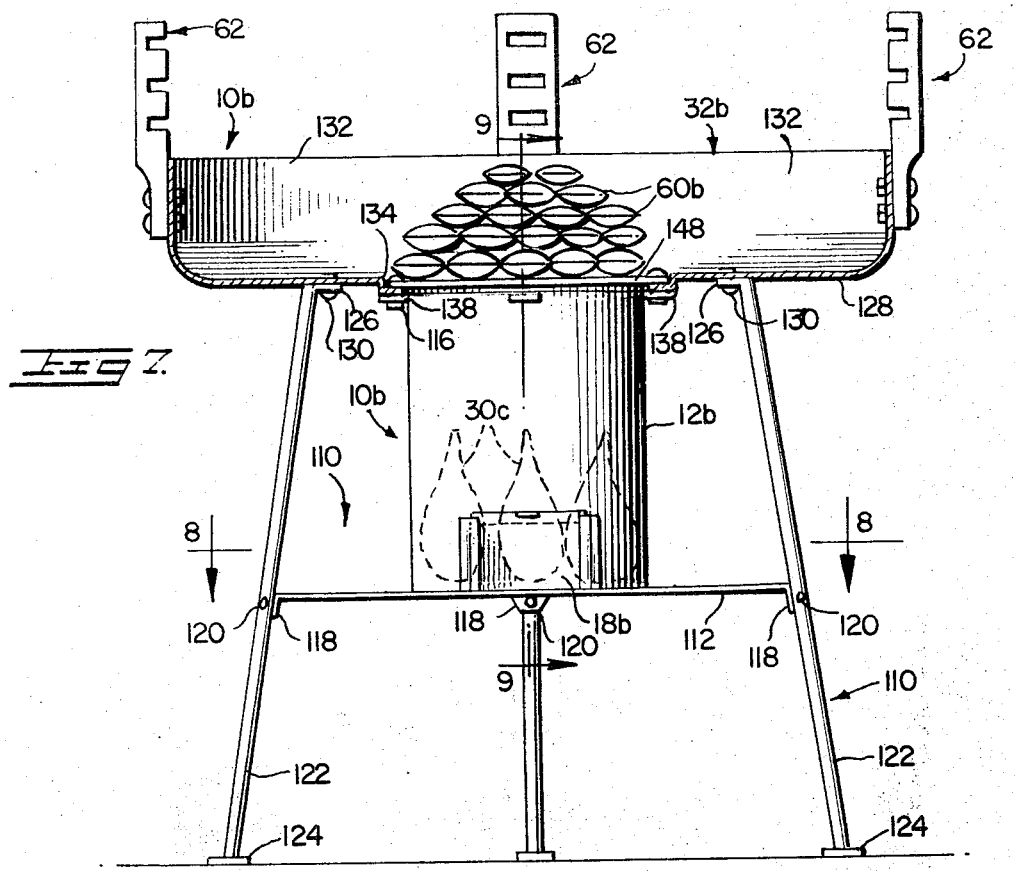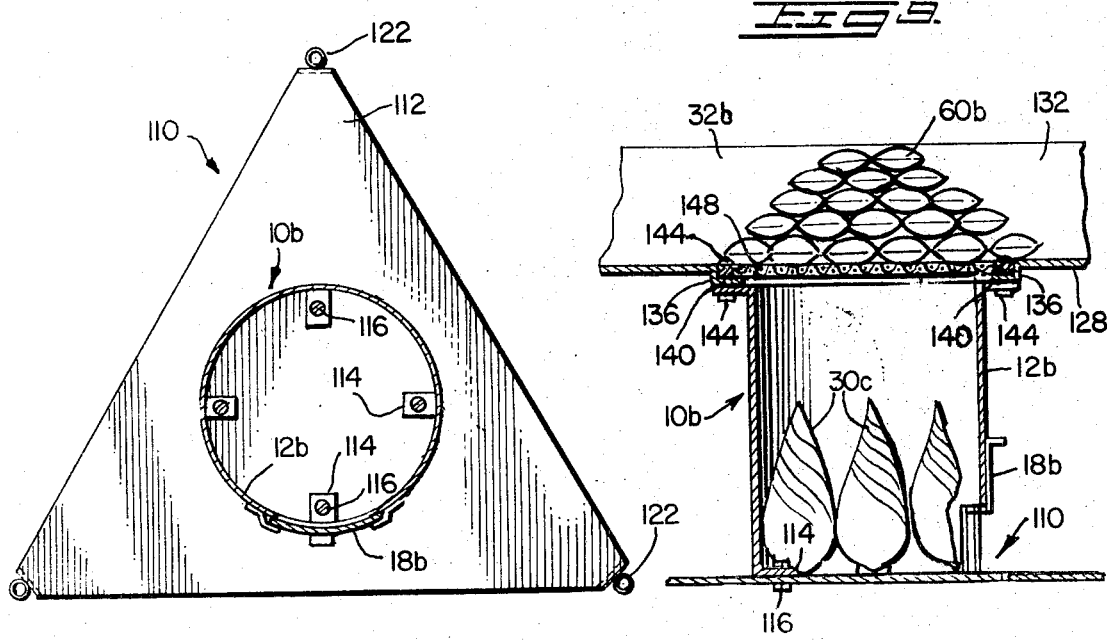

PORTABLE OUTDOOR GRILL AND FIRE STARTER UNIT

BACKGROUND OF THE INVENTION

1. Field of the Invention

The present invention generally appertains to new and novel improvements in outdoor stoves or cookers and also to fuel ignition devices for use therewith and is especially directed to a new and novel portable outdoor stove construction that can be expeditiously adapted to function in the related or dual capacities of a charcoal starter and an outdoor barbecue grill.

2. State of the Prior Art

There are many and varied types and forms of outdoor stoves and/or grills known in the prior art and commercially available. In the main, such known and marketed devices have a grill body which is adapted to contain a supply of charcoal briquets and which supports an attached grate means positioned over the charcoal and on which foodstuffs to be cooked are placed.

Since the desire of users of such outdoor stoves or grills is to have them in operation as quickly as possible when they are needed, many means have been developed and made available for effecting almost instantaneous ignition of the charcoal briquets which are difficult to readily ignite. Examples of means for producing rapid ignition of the charcoal are electrical starter rods and starter fluid, usually volatile hydrocarbon liquid. Such starter means are dangerous and also are not popular in that they require considerable effort for their use and in many instances and on some occasions they cannot be used. For example, the inaccessibility of electrical outlets in the case of electric starters renders them unusable and the transference of objectionable odors from the starter fluids to the foodstuffs in the instance of certain types of foodstuffs or grills is objectionable.

As a consequence, the provision and utilization of charcoal starters or ignitors as separate units has come into being and wide-spread practice. Wth such devices, that are usually in the form of a tubular flue having a grate means on which the charcoal briquets are supported, twisted or folded newspapers, or similar disposable and always handy and easily combustible material, are placed within the flue body and ignited so as to bring the charcoal to a sufficiently high temperature to effect ignition thereof. The papers are placed in the flue and ignited by a match or similar means and the flames and heat therefrom plays on the overlying charcoal on the grate means. After the charcoal briquets have become ignited, they are transferred to a grill body, as by being deposited on the bottom of the grill body.

The principal drawback with such starters resides in the fact that two separate units, the starter body and the grill body, have to be used, involving difficulties in transportation and erection at the place of utilization and also involving higher initial purchase costs and maintenance costs.

SUMMARY OF THE INVENTION

A primary object of the present invention is to provide a simple, inexpensive and efficient device that combines a grill body with a starter body in a way so that only one compact unit is needed for the quick grilling or cooking of foodstuffs with burning charcoal briquets that are initially speedily and thoroughly ignited by the free burning of paper or similar combustible material beneath the charcoal.

Generally considered, the present invention involves a lower tubular body that is formed from sheet metal or other similar material and which is vertically orientated on a horizontal support, either by being directly seated on a suitable support or by being supported thereon by a vertical leg assembly. The lower body constitutes a fire box within which crumbled or twisted newspapers or similar material are placed in a spacedly arranged upstanding manner. The fire box has a lower end portion which is provided with a controlled draft means for the controlled admission into the fire box at the lower end portion of oxygen containing air for supporting combustion of the papers. The fire box has an open upper end portion that is closed off by a transversely arranged grate means on which charcoal briquets or the like are adapted to be placed in a pile formation. The papers are ignited by a lit match or other source of primary flame and produce gaseous products of combustion that quickly rise in the vertical fire box so as to impinge on the charcoal and speedily heat the same to a very high temperature thereby causing ignition of the charcoal.

An upper tubular body of sheet metal or similar material is supportively mounted on the upper end portion of the fire box and defines a grill body which has a lower end portion suitably attached, either permanently or temporarily, to the upper end portion of the fire box so that the grill body is in vertical alignment with the fire box. The grill body has an open upper end portion which is provided with upstanding rests that are spaced apart in an angular relationship with an open area being provided between certain of the upstanding rests that is of a sufficient size to enable the lateral movement therebetween of a grid which is adapted to be seated on and supported by the rests in a manner when to close off the upper end portion of the grill body and to support foodstuffs in a position directly above the burning charcoal. The grid has a handle means so that it can be manually moved into a cooking position on the grill body and removed therefrom to a remote serving place. The rests are formed with inwardly facing, horizontally disposed slots in which the perimeter of the grid is adapted to fit with the slots being arranged in vertically spaced series so that the grid can be removably mounted on the rests at selected heights with regard to the underlying burning charcoals.

A further important object of the present invention is to provide a relatively small and compact device that can be used on any available horizontal supporting surface for use in igniting charcoal briquets for expeditious transfer to and use in a larger barbecue grill in a speedy and most efficient way or that can be expeditiously used as a complete quick starter and grilling or cooking unit and which, in such use, will be operational in a manner of minutes.

BRIEF DESCRIPTION OF THE DRAWINGS

FIG. 1 is a side elevational view, with a portion broken away and shown in section, of a portable outdoor grill and starter unit in accordance with the present invention.

FIG. 2 is an exploded perspective view of the components of the unit shown in assembled form in FIG. 1.

FIG. 3 is a top plan view of the unit of FIG. 1 and showing the manner of removing and inserting the foodstuff grid, with the same being shown in inserted position in full lines and in removed position in phantom lines.

FIG. 4 is a transverse cross-sectional view taken substantially on lines 4—4 of FIG. 1 and showing the adjustable draft control means.

FIG. 5 is a perspective view of the upper body portion or grill body in an inverted position so as to show the grate means that is fixedly carried by the lower end portion of the grill body.

FIG. 6 is a fragmentary vertical view of the manner for supportively attaching the lower end portion of the grill body to the upper end portion of the lower body or fire box.

FIG. 7 is a modified form of portable grill and starter unit with the grill body being of the pan type and having a central portion overlying and in vertical alignment with the fire box and on which the briquets are initially stacked, and having an overhanging portion over which the briquets are distributed after they have become ignited.

FIG. 8 is a transverse, cross-sectional view taken on lines 8—8 of FIG. 7 and showing the vertical leg assembly for supporting the unit of FIG. 7 on a horizontal support.

FIG. 9 is a vertical sectional view taken on lines 9—9 of FIG. 7.

DESCRIPTION OF THE PREFERRED EMBODIMENTS

Referring now more particularly to the accompanying drawings and initially to FIGS. 1–6, the grill or stove and starter unit 10 comprises a hollow lower body 12 in the form of a cylindrical-shaped tube. The lower body 12 is formed in such tubular form from sheet metal or similar light weight, substantially rigid and fire resistant material. The lower body has opposing open lower and upper end portions 14 and 16, respectively, so that it resembles a relatively small length of a conventional stove pipe. The tubular body 12 defines a fire box and is formed from a single flat blank that is rounded into the tubular form and has its side edges joined by a lock seam 17 that extends axially from one end portion to the other joining the side edge. Of course, the fire box can be formed in an extruded fashion, for example, from suitable materials, such as plastic, so that it would be seamless.

The lower end portion 14 is adapted to be seated on a horizontal support, such as on the lawn or sandy beach, so that the fire box is vertically orientated with the open lower end being closed off by the surface of the horizontal support. The lower end portion 14 is provided with inturned horizontally disposed tabs 15 that are angularly spaced apart and define foot pads to support the fire box on sandy surfaces or the like.

Adjustable draft control means 18 is provided for the fire box 12 at the lower end portion 14 and comprises a draft gate or plate 20 that is substantially curved to correspond to the curvature of a part of the cylindrical side wall of the fire box. The gate 20 controls a draft opening 22 in the side wall through which a controlled amount of oxygen containing air for supporting combustion within the fire box is admitted. The vertical side edges 24 of the draft gage 20 are slidably disposed in angular guide tracks 26 vertically provided at the vertical side edges of the draft opening. The draft gate has an upper end provided with a laterally outstanding hand grip tab 28 whereby the gate may be manually adjusted with the side edges thereof being frictionally held by the guide tracks in adjusted positions of the gate relative to the air opening 22.

The upper edge portion 16 of the tubular fire box 12 is open and the fire box is adapted to contain a plurality of twisted or crumbled newspapers 30 that may be arranged for burning in a singular manner or in a vertical grouping as shown in dotted lines in FIG. 1. The newspapers, or similar disposable and easily combustible material, are twisted and folded in singular manner into tear drop formations and placed with their larger ends down within the fire box.

The unit 10 further includes an upper body 32 that defines a grill body and is supported by the upper end portion of the fire box 12 so as to be in vertical alignment therewith. Grate means 34 is adapted to close off the upper end of the fire box and in the instance of the unit 10 of FIGS. 1–5 the grate means is carried by the grill body 32. Such body 32 is hollow and substantially tubular. Specifically, it is of a frusto-conical shape, and has an open lower minor end portion 36 and an open upper major end portion 38. The lower minor end portion of the frusto-conical body 32 is provided with a plurality of depending tabs 40 that are spaced angularly apart and are provided with transverse apertures 42.

The apertured tabs 40 are adapted to fit within the open upper end portion 16 of the fire box as shown in FIGS. 1, 2 and 6, and the apertures therein are brought into registry with openings 43 formed in the body of the fire box. Suitable fasteners 45 are disposed through the registered apertures and openings to fasten the tabs to the fire box so that the minor end of the grill body is supportively seated on the upper end portion 16 of the fire box.

The grill body has the edge of the upper major end portion 38 rolled outwardly, as at 44, so as to strengthen the edge and the grill body is provided, below such rolled upper edge 44, with diametrically opposing handle means 46. Each handle means includes parallel spaced apart arms 48 laterally outstanding from and rigidly fixed to the side wall of the grill body below the major end portion 38 and having outer ends which are joined by a rotatably journalled wooden roller or the like element 50. The handle element 50 is formed from non-conductive heat material so that the handle means can be grasped even though the grill body is hot from the gaseous combustion products therein. The lower end portion 36 has an inner annular rest 54 on which the peripheral edge ring 56 of a burner grate 58 of the grate means 34 is fitted so as to secure the grate means fixedly across the interior of the lower open end portion of the grill body. With the lower open portion 36 of the grill body attached to the upper end portion 16 of the fire box, as shown in FIG. 1, the grate means closes off the upper end portion of the grill body. The grate means is composed of criss-crossed bars attached to the peripheral ring 56 that is fitted on the seat 54 and the grate means is adapted to support charcoal briquets 60 arranged in a stacked pattern, as shown in FIG. 1. The charcoal briquets are heated to a high temperature, so as to cause ignition thereof, by the gaseous products of combustion rising in the fire box from the burning paper 30 which is ignited by a lit match or other source of primary flame inserted into the fire box through the opening 22.

Due to the mounting of the grill body 32 on the fire box and the fixation of the charcoal grate means 34 to the grill body along with the exterior handle means 46, the grill body can be used with the fire box solely as a fire starter for a large size outdoor grill or stove (not shown) into which the burning charcoal can be deposited by lifting the grill body off from or with the fire box and transporting it through the handle means to such a larger grill where the grill body can be inverted or turned upside down to dump the burning charcoal out through the open upper end portion 38 of the grill body. However, it is also and primarily intended that the grill body and fire box function as a unit 10 for the grilling or cooking of foodstuffs on the unit 10. In this respect, the upper edge portion 38 of the grill body has upstanding rests 62, attached thereto in an angularly spaced apart relationship, as shown in FIGS. 1, 2 and 3. The rests 62 have lower flattened and inturned mounting ends 64 which are fixed by suitable fasteners, such as bolts or rivets 66, to the outside wall of the grill body with the rests upstanding from the rolled top edge 44 of the grill body. Each rest has a bar 68 provided with a series of vertically spaced slots 70 that face inwardly and are adapted to seatingly receive the circular peripheral ring 72 of a foodstuff grid 74 that has parallel spaced apart rods 76 diametrically extending between and fixed to the ring 72 and reinforced by suitable cross bars 75. The ring is split and has its ends 78 radially extended in a joined relationship and fitted within a wooden or plastic hand grip 80.

As can be appreciated from the drawings, and especially from FIG. 3, the rests 62 are arranged in a diametrically opposed pair 62a and 62b with a third rest 62c being disposed intermediate such pair in an angular relationship therewith of approximately 90°. There are no rests between the pair 62a and 62b on the other side with such pair of opposing rests being spaced approximately 180° apart. Such 180° spacement creates an area through which the grid 74 can be laterally passed as it is positioned onto and removed from the rests 62 by the handle means 80. Thus, the grid can be moved laterally in a horizontal plane onto and from the rests and relative to a closure foodstuff cooking position on the upper end portion of the grill body and to a removed foodstuff serving position remote from the unit 10.

In the form of the invention shown in FIGS. 7-9, the unit 10b includes a cylindrical lower body 12b which defines the fire box with the draft control means 18b. The fire box 12b is provided with a supporting assembly 110 instead of the lower end portion thereof resting directly on a horizontal support. The supporting assembly 110 includes a flat triangular plate 112 which is horizontally arranged and transversely underlies and closes off the lower end or bottom of the fire box. The lower end portion is provided with angularly spaced apart, radially projecting and horizontally disposed apertured tabs 114 that are fastened by bolt assemblies 116 to the center of the plate 112, as shown in FIG. 8. The corners 118 of the plate 112 are bent downwardly to provide apertured fastening lips that are secured by bolts 120 to supporting legs 122 arranged in a tripod fashion. The lower ends of the legs 122 have pads 124 while the upper ends are inturned to provide apertured tabs 126 on which the flat bottom wall 128 of the grill body 32b rests and to which it is secured by bolts 130. The grill body is of the pan type and has a flat circular bottom wall 128 with an annular side wall 132 upstanding from the peripheral edge thereof.

The bottom wall 128 of the grill body 32b has a central opening 134 that is in vertical alignment with the upper end portion of the annular fire box 12b. The opening 134 is provided with a depressed bounding wall 136 that has an upper horizontal face 138. The face is flat and the wall 136 is formed with openings that are aligned with apertures formed in the annular outer edge portion 140 of a burner grate 148 that closes off the upper end of the fire box 12b. Bolt assemblies 144 secure the grate 148 in position, as shown in FIG. 9.

The grate 148 is disposed in substantially the same horizontal plane as the bottom wall 128 of the grill body. As shown in FIGS. 7 and 9, the charcoal briquets 60b are initially placed in a stacked arrangement on the grate directly above the fire box. After the briquets have become ignited from the hot gases rising in the fire box from the burning papers 30c, they are pushed or otherwise moved off from the grate and spread over the surface of the bottom wall 128 so as to occupy most of such surface in a single layer.

The annular side wall 132 of the grill body is formed with rests 62 in the same way and arrangement as the rests 62 of FIG. 1 to receive a foodstuff grid (not shown) like and in the same way as the grid 74 of FIG. 3.

It is believed from the foregoing description, taken in conjunction with the showings in the accompanying drawings, that the use and construction of the units, in any of the disclosed forms, will be clear. Of course, such description and illustrations are merely exemplary of the nature of the inventive concept which is defined and only delimited by the appended claims.

What is claimed is:

1. A portable outdoor grill and fire starter unit comprising a vertically oriented and centrally located relatively tall hollow lower body defining a fire starter box, the fire starter box having a vertical wall, a bottom joined to a base of the wall, closing the box at its bottom and forming an upward opening fire starter box, a large opening in the wall adjacent the base, through which crumpled paper or similar highly combustible material is pushed into the fire starter box and is ignited, a door connected to the wall adjacent the opening for moving out of and into an opening closing position for permitting insertion and ignition of paper and for controlling air draft moving into the fire starter box through the opening, guides mounted on the wall adjacent the large opening and extending laterally therebeyond for connecting the door to the wall and permitting selective uncovering of the opening by the door and for holding the door in a selectively opened position, said fire box having an open upper end portion, an upper body attached to said upper end portion and defining a relatively short grill body, means for attaching said grill body centrally to the upper end portion of the fire box so that it upstands therefrom in substantial vertical alignment with the interior of the fire box, burner grate means transversely disposed with respect to the interior of the fire box and arranged to close off the open upper end thereof, said burner grate means being arranged centrally in the grill body to support charcoal briquets within the bottom of the grill body so that the charcoal briquets are ignited by the combustion gases rising in the fire box from the burning paper, said grill body having an upper end portion, a foodstuff grid, and means provided on the upper end portion of the grill body for supporting the grid in a manner so that the grid closes off the upper end portion of the grill body and overlies the ignited charcoal briquets.

2. The invention of claim 1 wherein said means for attaching the grill body to the fire box includes depending tabs on the grill body telescopically fitted on the open upper end portion of the fire box and means for releasably fastening said tabs on the fire box.

3. The invention of claim 1 wherein said means for attaching the grill body to the fire box includes depending tabs on the grill body fitted on the upper end portion of the fire box and means for securing said tabs on the upper end portion of the fire box.

4. The invention of claim 1 wherein the fire starter box wall is curved and has a curved lower end portion provided with carved adjustable draft control guide means for holding the door in slideably adjusted condition of opening.

5. The invention of claim 1 wherein said drill has a lower end portion provided with supporting feet.

6. The invention of claim 1 wherein said grill body has a flat bottom wall of an area greater than the cross-sectional area of the fire box and said bottom wall having an apertured central portion overlying and secured to the upper end portion of the fire box with the rest of the bottom wall overhanging the fire box, said burner grate means being positioned in closure relation to said apertured central portion and overlying the fire box.

7. The invention of claim 1 and further including a tripod leg assembly having upper ends supportively attached to the grill body and having medial portions attached to a horizontal pan which is connected to a lower end of the fire starter box for supporting the grill body and the fire starter box in a vertical assembled position on a horizontal support.

8. The apparatus of claim 1 wherein the lower body is a cylinder oriented on a vertical axis, wherein the cylindrical lower body has a lower end configured for resting on the ground, wherein the upper, grill body rests on the lower body and is supported by the lower body, and wherein the upper grill body extends radially outward and upward from the cylindrical lower body.

* * * * *